United States Patent
Jansen et al.

(10) Patent No.: US 7,097,909 B2
(45) Date of Patent: Aug. 29, 2006

(54) NONFELTING WOOL AND ANTIFELT FINISHING PROCESS

(75) Inventors: Bernhard Jansen, Köln (DE); Ferdi Kümmeler, Leverkusen (DE); Ralf Heinen, Köln (DE)

(73) Assignee: LANXESS Corporation, Pittsburgh, PA (US)

( * ) Notice: Subject to any disclaimer, the term of this patent is extended or adjusted under 35 U.S.C. 154(b) by 257 days.

(21) Appl. No.: 10/688,319

(22) Filed: Oct. 16, 2003

(65) Prior Publication Data

US 2005/0244591 A1 Nov. 3, 2005

Related U.S. Application Data

(62) Division of application No. 09/995,968, filed on Nov. 28, 2001, now Pat. No. 6,649,029.

(30) Foreign Application Priority Data

Dec. 1, 2000 (DE) .............................. 100 60 048

(51) Int. Cl.
 *B32B 27/00* (2006.01)
 *G02G 3/04* (2006.01)
 *D06M 10/10* (2006.01)
(52) U.S. Cl. ................ 428/423.4; 428/375; 428/423.1; 8/115.6; 8/115.52; 8/128.1; 8/112
(58) Field of Classification Search ..................... None
 See application file for complete search history.

(56) References Cited

U.S. PATENT DOCUMENTS

| | | | |
|---|---|---|---|
| 3,657,002 A | 4/1972 | Blodger et al. | 117/141 |
| 4,964,875 A | 10/1990 | Hendricks et al. | 8/442 |
| 6,103,068 A | 8/2000 | Merten et al. | 204/164 |
| 6,242,059 B1 | 6/2001 | Jansen et al. | 427/562 |

FOREIGN PATENT DOCUMENTS

| | | |
|---|---|---|
| DE | 5367 | 9/1954 |
| DE | 5379 | 10/1954 |
| DE | 26 57 513 | 7/1977 |
| DE | 197 31 562 | 1/1999 |
| DE | 197 36 542 A1 | 2/1999 |
| DE | 198 58 734 | 6/2000 |
| EP | 0 272 941 | 6/1988 |

OTHER PUBLICATIONS

Kan C W Et Al: Effect of Low Temperature Plasma, Chlorination, and Polymer Treatments and Their Combinations on the Properties of Wool Fibers: Textile Research Journal, Textile Research Institute. Princeton, N.J, US, Bd. 68, Nr. 11, Nov. 1, 1998, Seiten 814-820, XP000782407 ISSN: 0040-5175 *das ganze Dokument.

*Primary Examiner*—Margaret Einsmann
(74) *Attorney, Agent, or Firm*—Nicanor A. Kohncke

(57) ABSTRACT

The present invention relates to a specific process in which wool is initially subjected to a plasma treatment and then to a wet chemical treatment with a finishing agent, which provides nonfelting wool in a technically simple and easily handleable manner.

20 Claims, No Drawings

NONFELTING WOOL AND ANTIFELT FINISHING PROCESS

This application is a Divisional of Ser. No 09/995,968 filed Nov. 28, 2001 now U.S. Pat. No. 6,649,029.

BACKGROUND OF THE INVENTION

The invention relates to nonfelting wool and a process for antifelt finishing by treating the wool with a plasma and also to an aftertreatment with a specific finishing agent.

The textile processing industry has a particular interest in reducing the felting tendency of wool, especially of raw wool or unprocessed wool. The felting of wool is customarily reduced by finishing with specific auxiliaries.

Isocyanates, especially self-dispersing isocyanates, have long been used as auxiliaries for the antifelt finishing of textiles. However, self-dispersing isocyanates, the use of which has become preferred, do not always provide a completely satisfactory antifelt finish on the treated textiles when used alone.

DE-A 198 587 34 and DE-A 198 587 36 disclose the antifelt finishing of wool by combination of a plasma treatment with an after-treatment using such self-dispersing isocyanates. To apply these self-dispersing isocyanates to the wool, it is first necessary to prepare aqueous dispersions. Since such dispersions have only a very limited shelf life, due to the ensuing crosslinking reaction of the isocyanate end groups in water, they have to be prepared relatively shortly before use for wool treatment.

DE-A 2 035 172 describes a process for the antifelt finishing of wool in which the wool is treated with a polyurethane latex liquor and the fabric is dried and subsequently cured. To be able to prepare latices suitable for finishing, organic solvents and external emulsifiers have to be used at the prepolymerization stage. The prepolymers initially obtained are subsequently fully polymerized by addition of a chain extender.

DE-A 26 57 513 discloses a process for the antifelt finishing of wool using reaction products of polyisocyanates with hydroxyl-functional compounds.

DD 5381 describes a process for preparing hydrophilic basic polyurethanes from diisocyanates, diprimary aliphatic glycols containing one or more basic tertiary nitrogen atoms in open chain, and diprimary glycols without basic nitrogen. Possible applications mentioned for such products are very generally films, fibers, sizing and hand modifying agents, animalizing agents, and sizing agents for paper.

DD 5379 describes a process for preparing hydrophilic basic polyurethanes from diisocyanates and nitrogenous glycols containing, in the chain between the hydroxyl groups, one or more tertiary nitrogen atoms in which third valencies are saturated by monovalent alkyl groups that do not have more carbon atoms than the shortest carbon chain between a hydroxyl group and tertiary nitrogen. Possible applications mentioned for such products are very generally films, fibers, sizing and hand modifying agents, animalizing agents, and sizing agents for paper.

DD 5367 describes very specific polyurethanes prepared from diisocyanates and N,N'-di[oxyalkyl]piperazines.

It is an object of the present invention to provide an improved process for the antifelt finishing of wool.

SUMMARY OF THE INVENTION

The present invention accordingly provides a process for antifelt finishing of wool comprising (a) exposing wool to a plasma in a pretreatment, and
(b) treating the plasma-treated wool with an aqueous dispersion of cationic polyurethanes.

DETAILED DESCRIPTION OF THE INVENTION

The plasma treatment of the wool in step (a) of the process of the invention is effected either as a low temperature plasma treatment at reduced pressure or as a corona treatment at normal pressure.

The low temperature plasma treatment is extensively described in DE 196 16 776 C1 (counterpart of U.S. Pat. No. 6,103,068, hereby expressly incorporated by reference). The wool is exposed to a radiofrequency discharge of a frequency of 1 kHz to 3 GHz and a power density of 0.003 to 3 W/cm$^3$ at a pressure of $10^{-2}$ to 10 mbar for a period of 1 to 600 sec in the presence or absence of non-polymerizing gases. The process is preferably carried out under a pressure of 0.1 to 1 mbar and for a period of 2 to 5 minutes.

The actual low temperature plasma is generated by feeding in electromagnetic radiation in the frequency range of 1 kHz to 3 GHz. In a preferred variant, the low temperature plasma is generated via a microwave discharge of 1 to 3 GHz (the power density at the outcoupling is especially 0.1 to 15 W/cm$^2$). The electromagnetic radiation can be supplied continuously or pulsed. A pulsed high frequency discharge having a pulsing frequency of up to 10 kHz is especially advantageous.

When non-polymerizing gases are additionally used as plasma process gases, they are introduced into the plasma treatment space at a flow rate of up to 200 l/h. Useful non-polymerizing gases are in particular oxygen, nitrogen, noble gases, especially argon, air, or mixtures thereof.

The design and construction of a low temperature plasma reactor are known. Preference is given to using an electrodeless reactor having an outcoupling for microwaves. The wool to be treated is preferably placed underneath the outcoupling unit. The distance of the wool from the outcoupling unit is preferably 1 to 30 cm, especially 2 to 10 cm. After the wool to be treated has been introduced into the reactor, the reactor is suitably evacuated with vacuum pumps in such a way that the pressure during the plasma treatment is in the range of $10^{-2}$ to 10 mbar, preferably 0.1 to 1 mbar. A continuous flow-through operation is preferably carried out by applying specific vacuum locks that make it possible for the material to enter and exit without leakage.

Alternatively to this embodiment of the low temperature plasma treatment under low pressure, the wool can also be subjected to a corona treatment at a pressure in the range of 100 mbar to 1.5 bar, preferably at atmospheric pressure. The corona treatment is described in detail in DE-A 198 587 36 (counterpart of U.S. Pat. No. 6,242,059, hereby incorporated by reference).

The corona treatment subjects the wool to a high frequency discharge having a power density of customarily 0.01 to 5 Ws/cm$^2$ for a period of 1 to 60 seconds (preferably 2 to 40 seconds, particularly 3 to 30 seconds) in the presence or absence of non-polymerizing gases. Suitable non-polymerizing gases are air, oxygen, nitrogen, noble gases, or mixtures thereof.

The actual plasma is generated by applying an alternating voltage of 1 to 20 kV in the frequency range between 1 kHz to 1 GHz (preferably 1 to 100 kHz) to electrodes, one or both poles being provided with an insulator material. The alternating voltage can be supplied either continuously or with individual pulses or with pulse trains and pauses in between.

The design and apparatus configurations of a corona reactor are known and described, for example, in DE-A 197 31 562. The corona treatment is preferably carried out via electric discharges in the atmospheric pressure region, for which the wool to be treated is initially introduced into a sealed, tight treatment housing, charged there with the working gas, i.e., the above-mentioned non-polymerizing gas, and subsequently exposed to an electric barrier discharge in a gap between the two treatment electrodes. The distance of the wool material from the treatment electrodes is 0 to 15 mm, preferably 0.1 to 5 mm, particularly 0.3 to 2 mm. The treatment electrodes are preferably constructed as rotatable rolls either or both of which are coated with electrically refractory dielectric material.

Performing the corona treatment at a pressure in the range from 100 mbar to 1.5 bar, preferably at atmospheric pressure, has the advantage over the low pressure plasma treatment at $10^{-2}$ to 10 mbar that the equipment needed is very much less complicated than in the case of the low pressure treatment. Vacuum pumps are not required, nor is it necessary to fit special vacuum locks.

The special effect of the plasma treatment in step (a) of the process of the invention might be explained as follows. The liquid present in the fiber desorbs from the fiber surface as water vapor/gas during the process. High energy electrons, ions, and also highly excited neutral molecules or radicals are formed and act on the surface of the fiber, the water vapor desorbed from the fiber ensuring that particularly reactive particles are formed in the immediate vicinity of the respective fiber surface and these particularly reactive particles act on the surface.

Following the plasma treatment in step (a) of the process according to the invention, the wool is treated in step (b) with an aqueous solution of cationic polyurethanes.

These cationic polyurethanes have a weight average molecular weight of at least 14,000, preferably at least 16,000, particularly preferably at least 18,000, especially at least 20,000. The upper limit of the molecular weight is customarily 200,000, preferably 180,000, particularly preferably 150,000.

The cationic polyurethanes are obtainable by reaction of
(i) organic polyisocyanates of the general formula (I)

$$Q[NCO]_p, \qquad (I)$$

where
p is from 1.5 to 5, and
Q is an organic radical, and
(ii) one or more bis- and/or polyhydroxy compounds containing at least one tertiary nitrogen atom and at least two hydroxyl groups, wherein the cationic character of the polyurethane is generated by subsequent protonation or alkylation of the tertiary nitrogen atoms.

Optionally, the cationic polyurethanes used according to the invention are prepared by additionally using
(iii) one or more bis- and/or polyhydroxy compounds that contain no nitrogen atoms and have molecular weights of 62 to 5,000. Useful organic polyisocyanates (i) of the general formula (I)

$$Q[NCO]_p, \qquad (I)$$

where Q and p are each as defined above and include, for example, the following three types:
(1) aliphatic, cycloaliphatic, araliphatic, and aromatic polyisocyanates,
(2) aliphatic, cycloaliphatic, araliphatic, and aromatic polyisocyanates that contain isocyanurate and/or uretidione and/or allophanate and/or biuret and/or oxadiazine structures, and
(3) isocyanate prepolymers that are obtainable by reaction of aliphatic, cycloaliphatic, araliphatic, and aromatic diisocyanates and polyesters and/or polyethers.

The aliphatic, cycloaliphatic, araliphatic, and aromatic polyisocyanates (2) with isocyanurate and/or uretidione and/or allophanate and/or biuret and/or oxadiazine structures are preparable according to conventional prior art processes from corresponding aliphatic, cyclo-aliphatic, araliphatic, and aromatic diisocyanates.

The isocyanate prepolymers (3) are reaction products of aliphatic, cycloaliphatic, araliphatic, and aromatic diisocyanates and polyesters and/or polyethers, which optionally may contain unconverted, free polyisocyanates.

Illustrative examples of aliphatic, cycloaliphatic, araliphatic, and aromatic diisocyanates useful as type (1) or for preparing types (2) and (3) are 1,4-diisocyanatobutane, 1,6-diisocyanatohexane, 1,5-diisocyanato-2,2-dimethylpentane, 2,2,4-trimethyl-1,6-diisocyanatohexane, 1,3- and 1,4-diisocyanatocyclohexane, 1-isocyanato-1-methyl-4-isocyanatomethylcyclo-hexane, 4,4'-diisocyanatocyclohexylmethane, 2,4- and 2,6-diisocyanato-1-methylbenzene, 4,4'-diisocyanatodiphenylmethane, or any mixtures of these diisocyanates.

Preferred examples of modified diisocyanates (2) are trimerization products of hexamethylene diisocyanate and of its biuret-based derivatives, mixtures of the uretidione and the trimerization products of hexamethylene diisocyanate, and the uretidione of toluene diisocyanate.

Preferred examples of the isocyanate prepolymers (3) are reaction products of toluene diisocyanate or of hexamethylene diisocyanate with polyhydric alcohols, for example, of toluene diisocyanate with trimethylol-propane.

Preference is given to organic polyisocyanates of the general formula (I)

$$Q[NCO]_p, \qquad (I)$$

where
p is from 1.5 to 5 (especially 2), and
Q is an aliphatic hydrocarbon radical having 2 to 18 (especially 6 to 10) carbon atoms, a cycloaliphatic hydrocarbon radical having 4 to 15 (especially 5 to 10) carbon atoms, an aromatic hydrocarbon radical having 6 to 15 (preferably 6 to 13) carbon atoms, or an araliphatic hydrocarbon radical having 8 to 15 (preferably 8 to 13) carbon atoms.

Preferred bis- and/or polyhydroxy compounds (ii) are those of the general formula (II)

$$HO-(CHR^1)_m-NR^2-(CH_2R^1)_n-OH \qquad (II),$$

where
n and m are independently from 1 to 6,
$R^1$ is in each case independently hydrogen or a straight-chain or branched $C_1$–$C_4$-alkyl radical wherein, along the $(CHR^1)_n$ and $(CHR^1)_m$ alkylene chains, $R^1$ can alternately from carbon atom to carbon atom be not only hydrogen but also a straight-chain or branched $C_1$–$C_4$-alkyl radical, and
$R^2$ is straight-chain or branched $C_1$–$C_{10}$-alkyl (especially $C_1$–$C_6$-alkyl), $C_1$–$C_{10}$-cycloalkyl (especially $C_5$–$C_6$-cycloalkyl), $C_6$–$C_{12}$-aryl (especially phenyl), or a —$(CH_2)_r$—OH radical in which r is from 1 to 6.

Illustrative examples of bis- and/or polyhydroxy compounds (ii) of the general formula (II) are N-methyldiethanolamine, N-ethyldiethanolamine, N-butyldiethanolamine, N-methyldipentanolamine-1,5, N-ethyldipentanolamine-1, 5, triethanolamine, reaction products of fatty amines with two moles of ethylene oxide or propylene oxide or alkoxylation products of the aforementioned compounds, preferably of tris[2-(2-hydroxyethoxy)ethyl]amine.

Illustrative examples of bis- and/or polyhydroxy compounds (iii) that contain no nitrogen atoms and have molecular weights of 62 to 5,000 are ethylene glycol, propanediol-1,2, propanediol-1,3, butanediol-1,4, butanediol-1,3, butanediol-2,3, butanediol-1,2, butenediol-1,4, butynediol-1,4, pentanediol-1,5, neopentyl glycol, hexanediol-2,5, hexanediol-1,6,3-methylpentanediol-1,5,2,5-dimethylhexane-2,5-diol, octadecanediol-1,12, diethylene glycol, dipropylene glycol, triethylene glycol, tripropylene glycol, tetraethylene glycol, tetrapropylene glycol, and also further higher polyethylene and polypropylene glycols, glycerol, trimethylolpropane, 2-hydroxymethyl-2-methyl-1,3-propanediol, 1,2,6-hexanetriol, or pentaerythritol.

It is further possible to use polyethers and polyesters having a weight average molecular weight of up to 5,000 (preferably up to 3,000, particularly preferably up to 2,000) as component (iii). Polyethers are obtainable from the above-mentioned bis- and/or polyhydroxy compounds as starter molecules by reaction with ethylene oxide, propylene oxide, and/or butylene oxide according to known processes of the prior art. Polyesters are likewise obtainable from the above-mentioned bis- and/or polyhydroxy compounds, namely by esterification with industrially available di- or tricarboxylic acids according to known processes of the prior art.

Particularly useful cationic polyurethanes are obtained by reaction of (i) organic polyisocyanates of the general formula (I)

$$Q[NCO]_p, \quad (I)$$

where p is from 1.5 to 5 (especially 2), and

Q is an aliphatic hydrocarbon radical having 2 to 18 (especially 6 to 10) carbon atoms, a cycloaliphatic hydrocarbon radical having 4 to 15 (especially 5 to 10) carbon atoms, an aromatic hydrocarbon radical having 6 to 15 (preferably 6 to 13) carbon atoms, or an araliphatic hydrocarbon radical having 8 to 15 (preferably 8 to 13) carbon atoms, and (ii) bis- and/or polyhydroxy compounds (ii) of the general formula (II)

$$HO-(CHR^1)_m-NR^2-(CH_2R^1)_n-OH \quad (II),$$

where n and m are independently from 1 to 6 and are especially identical and from 1 to 3, $R^1$ is in each case independently hydrogen or a straight-chain or branched $C_1$–$C_4$-alkyl radical wherein, along the $(CHR^1)n$ and $(CHR^1)_m$ alkylene chains, $R^1$ can alternately from carbon atom to carbon atom be not only hydrogen but also a straight-chain or branched $C_1$–$C_4$-alkyl radical, and $R^2$ is straight-chain or branched $C_1$–$C_{10}$-alkyl (especially $C_1$–$C_6$-alkyl), $C_1$–$C_{10}$-cycloalkyl (especially $C_5$–$C_6$-cycloalkyl), $C_6$–$C_{12}$-aryl (especially phenyl), or a $-(CH_2)_r-OH$ radical in which r is from 1 to 6, especially from 1 to 3, and the cationic character of the polyurethanes is generated by subsequent protonation or alkylation of the tertiary nitrogen atoms.

Very particular preference is given to using in step (b) of the process according to the invention cationic polyurethanes obtained by reaction of (i) 2,4-toluene diisocyanate or 2,6-toluene diisocyanate or mixtures of these isomers with (ii) N-methyl- or N-butyldiethanolamine, wherein the cationic character is generated by treating the reaction products with one of the acids hydrochloric acid, sulfuric acid, formic acid, acetic acid, or propionic acid.

To prepare the cationic polyurethanes to be used in step (b) of the process according to the invention, the bis- and/or polyhydroxy compounds (ii) and optionally (iii) are customarily initially charged in an aprotic auxiliary solvent.

It is advantageous to choose the amount of polyhydroxy compounds (ii) and optionally (iii) in such a way as to still obtain a readily processible cationic polymer.

Illustrative examples of aprotic solvents for the reaction are alkyl ether acetates, glycol diesters, toluene, carboxylic esters, acetone, methyl ethyl ketone, tetrahydrofuran, dimethylformamide, and N-methylpyrrolidone.

This initially charged solution then has added to it the organic polyisocyanate (i) with stirring. Excesses of organic polyisocyanate must be avoided in the process, since this leads to undesirable secondary reactions due to the presence of a multiplicity of tertiary amine structures from the components (ii) and optionally (iii).

Conventional catalysts such as dibutyltin dilaurate, tin(II) octoate, or 1,4-diazabicyclo[2.2.2]octane and/or further compounds containing tertiary nitrogen or tin and also optionally bismuth compounds or other customary polyurethane chemistry catalysts in amounts of 10 to 1,000 ppm, based on the reaction components, can be used to speed up the reaction. The reaction is carried out in the temperature range up to 130° C., preferably in the range from 20 to 80° C. The upper limit of the reaction temperature is set by the boiling point of the solvent; it can be advantageous to conduct the reaction under evaporative cooling. The reaction is monitored by determining the NCO content by titration or by measurement of the IR spectra and evaluation of the NCO band at 2260 to 2275 cm$^{-1}$ toward the end of the reaction and is complete when the isocyanate content is not more than 0.1% by weight above the value that is obtained at complete conversion under the given stoichiometry or when the NCO band has disappeared.

It is advantageous for the molar ratio of component (i) to component (ii) plus optional component (iii) to be set in such a way as to have an approximately stoichiometric ratio of the NCO and OH end groups present.

The polyurethanes are customarily rendered cationic in one of the following two ways:

First, it is possible to dilute the solution of the polyurethane as prepared with an aqueous acid after the reaction. Useful acids include, for example, hydrochloric acid, sulfuric acid, formic acid, acetic acid, or propionic acid. Formic acid and acetic acid are preferred. This addition of an acid protonates the tertiary nitrogen atoms from component (ii) and, if used, component (iii). It is customary to use a stoichiometric amount of acid, based on the nitrogen atoms, so that ideally complete protonation is obtained. The solvent is then distilled off until the theoretical solids content is obtained.

On the other hand, it is also possible for the polyurethane prepared as described above to be converted into a polyurethane having permanent cationic charges by partial or complete alkylation. This can be accomplished according to conventional processes directly following preparation, either in organic solution or else in the aqueous state. The alkylating agents used are preferably methyl chloride, methyl iodide, dimethyl sulfate, or methyl p-toluenesulfonate.

In step (b) of the process according to the invention the aqueous dispersion of the cationic polyurethane is applied to the wool at a pH of 2 to 7, preferably 3 to 6, particularly preferably 4 to 6 and especially 4.5 to 5.5. The application temperature is customarily in the range from 20 to 80° C., preferably from 30 to 70° C., particularly preferably from 30 to 60° C.

The concentration of the aqueous dispersion of the cationic polyurethane, based on the solids content of polyurethane, in the finishing liquor is 0.5 to 75 g/l, preferably 1 to 50 g/l.

The treatment with the aqueous solution of cationic polyurethanes of the wool in step (a) is effected according to customary processes of the prior art. Suitable is, for example, a batchwise method by the exhaust process or a continuous method by dipping, roll application, padding, application of a mist or spray, or backwasher application optionally using dyeing machines, stirrers, and the like to agitate the treatment liquor. The liquor ratio can be chosen within wide limits and can be within the range of (20 to 5):1, preferably (10 to 5):1.

Unexpectedly, the cationic polyurethanes are very quick to exhaust onto the wool in step (b) of the process according to the invention. This is all the more surprising as, at the slightly acidic pH customarily used for the aqueous liquor, the wool itself has a cationically charged surface, whereby the cationic polyurethanes should actually be repelled, which would result in worse exhaustion characteristics for the polyurethanes.

The treatment in step (b) is optionally followed by a further after-treatment step (c) in which the wool is treated with further auxiliaries and additives. Useful such auxiliaries and additives include, for example, flow control agents, levelling agents, surfactants, deaerators, wetting agents, distancing agents, exhaustion auxiliaries, and fixatives.

The cationic polyurethanes used in the process of the invention have incomparably better stability in aqueous dispersion than the self-dispersing isocyanates known from DE-A 198 587 34 and DE-A 198 587 36. The corresponding dispersions therefore have far longer use lives and can be prepared and utilized with long lead times.

The present invention further provides the nonfelting wool, characterized in that the wool
(a) is exposed to a plasma in a pretreatment, and
(b) treated with an aqueous dispersion of cationic polyurethanes.

The two steps (a) and (b) are subject to the above remarks for the process.

The wool used in the process of the invention may be selected from a very wide range of wool materials, for example, raw wool after the raw wool wash, dyed or undyed wool slubbing, dyed or undyed wool yarn, roving, drawn-loop knits, formed-loop knits, wovens, or cloths. The water content of the wool is customarily 4 to 40% by weight, preferably 5 to 30% by weight, particularly preferably 6 to 25% by weight, especially 8 to 15% by weight.

The wool of the present invention, finished with cationic polyurethanes, differs substantially from wool finished with self-dispersing isocyanates. The self-dispersing isocyanates known from DE-A 198 587 34 and DE-A 198 587 36 are compounds that are located in the low molecular weight range and are prepared, for example, by reaction of organic diisocyanates such as diisocyanatobutane with monofunctional polyalkylene oxide alcohols, amines, or thiols. These self-dispersing isocyanates crosslink on the surface of the wool in the presence of water. The NCO end groups of the polyisocyanates react with the water to detach $CO_2$ and to form longer chains through formation of urea moieties as bridge members between pairs of isocyanate molecules. The crosslinked longer chains thus have relatively many urea moieties and only very few urethane bonds. By contrast, polyurethanes having the stated high molecular weights have a very large number of urethane bonds in the main chain. Due to the higher molecular weights, the end group concentration is relatively low and the end groups themselves are difficult to access. Crosslinking of the small number of NCO end groups possibly present under the influence of water is therefore hardly likely.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

I Preparation of Cationic Polyurethanes

Polyurethane 1 (Inventive)

174.5 g of toluene diisocyanate (mixture of 2,4- and 2,6-isomer in a ratio of 20:80; 1.003 mol) are added to a solution of 119.2 g of N-methyl-diethanolamine in 250 g of acetone at room temperature over the course of 1.5 hours. An infrared spectrum is then recorded to check if there are still any free isocyanate groups left over. If this is not the case, 707 g of water and 60 g of glacial acetic acid are added as a mixture. This results in the formation of a homogeneous clear liquid, from which the solvent is distilled. The distillation is terminated once the solids content is 29%.

Polyurethane 2 (Inventive)

168.8 g of toluene diisocyanate (mixture of 2,4- and 2,6-isomer in a ratio of 20:80; 0.97 mol) are added to a solution of 119.2 g of N-methyl-diethanolamine in 250 g of acetone at room temperature over the course of 1.5 hours. An infrared spectrum is then recorded to check if there are still any free isocyanate groups left over. If this is not the case, 696 g of water and 60 g of glacial acetic acid are added as a mixture. This results in the formation of a homogeneous clear liquid, from which the solvent is distilled. The distillation is terminated once the solids content is 29%.

Polyurethane 3 (Inventive)

168.5 g of hexamethylene diisocyanate (1.003 mol) are added to a solution of 59.6 g of N-methyldiethanolamine (0.5 mol) and 31.1 g of ethylene glycol in 250 g of acetone at reflux temperature over the course of 1.5 hours. An infrared spectrum is then recorded to check if there are still any free isocyanate groups left over. If this is not the case, 580 g of water and 31.3 g of glacial acetic acid are added as a mixture. This results in the formation of a homogeneous clear liquid, from which the solvent is distilled. The distillation is terminated once the solids content is 30.9%.

Self-dispersing Isocyanate 4 (Comparative)

85 parts by weight of an isocyanate having an NCO content of 22.5% and consisting essentially of trimeric hexamethylene diisocyanate are reacted at 60° C. with 15 parts by weight of a polyethylene glycol monomethyl ether having an average molecular weight of 350. The resultant product has an NCO content of 17% and a viscosity of 1,500 mPas at 25° C. The product is very efficiently dispersible in a water-filled glass beaker simply by stirring with a glass rod. The arithmetic NCO functionality is F is 2.70.

II Finishing of Wool and Nonfelting Test (a) Plasma Pretreatment

Moist wool slubbing is initially subjected to a corona treatment for which the following parameters are observed:

| | |
|---|---|
| Frequency: | 23.0 Hz |
| Roll gap: | 0.8 mm |
| Air supply: | 400.0 l/min |
| Pulse full-cycles on: | 2 |
| Pulse full-cycles off: | 8 |
| Spread: | 1:2 |
| Forward feed rate: | 10 m/min |
| Power: | 780 W |

(b) Wet Chemical Treatment

The moist wool slubbing pretreated according to step (a) is treated by the exhaust process with a solution of the above-described polyurethanes that is buffered to pH 5 via an acetic acid/acetate buffer. When the self-dispersing isocyanate is used, a similar procedure is carried out at a pH 7, set using a phosphate buffer.

The slubbing is prewetted in warm water and whirled to spin off excess water. The finishing bath of warm water at 40° C. is admixed with 2% (solid, based on the wool weight in the dry state) of the respective polyurethanes while observing a liquor ratio of 20:1. The wool remains in the bath for 20 minutes and is then removed, squeezed off, washed three times manually with water in a beaker, again squeezed off, and suspended from a line to dry.

After drying, the wool is subjected to the Aachen felting ball test of IWTO standard 20–69. The results are summarized below in Table 1:

TABLE 1

| Example | Aftertreatment agent | Average felting ball diameter [cm] |
|---|---|---|
| Inventive 1 | Polyurethane 1 | 3.794 |
| Inventive 2 | Polyurethane 2 | 3.754 |
| Inventive 3 | Polyurethane 3 | 3.494 |
| Comparative 4 | Self-dispersing isocyanate 4 | 3.437 |

Comparative Examples 5 and 6

In Comparative Example 5, the Aachen felting ball test is measured on the wool following a plasma treatment only, i.e., after the step (a) described above for Inventive Examples 1 to 3 and Comparative Example 4 has been carried out.

In Comparative Example 6, the wool is exclusively treated with the self-dispersing isocyanate according to the step (b) treatment described above for Comparative Example 4 and then subjected to the Aachen felting ball test.

A comparison of the felt densities, which are likewise measurable in the Aachen felting ball test, for the different pre- and aftertreatments of the wool stubbing is contained in Table 2:

TABLE 2

| Example | Antifelt finishing process | Felt density [g/cm$^3$] |
|---|---|---|
| Inventive 1 | Wool, plasma treated + polyurethane 1 | 0.036 |
| Inventive 2 | Wool, plasma treated + polyurethane 2 | 0.036 |
| Comparative 4 | Wool, plasma treated + self-dispersing polyisocyanate 4 | 0.04 |
| Comparative 5 | Wool, plasma treated | 0.11 |
| Comparative 6 | Wool, untreated + self-dispersing polyisocyanate 4 | 0.14 |

What is claimed is:

1. A non-feltlng wool obtained by
    a) exposing the wool to plasma in pretreatment wherein the plasma treatment causes the removal of water and the formation of reactive molecules on the wool, and
    b) treating the plasma-treated wool with an aqueous dispersion of cationic polyurethanes.

2. A non-felting wool comprising wool comprised of wool fibers having a surface wherein high energy electrons, ions, and high energy neutral molecules and radicals have been formed on the surfaces of the wool fibers by pretreatment of exposure to plasma and the pretreated wool has been treated with an aqueous dispersion of cationic polyurethanes.

3. The non-felting wool of claim 2, wherein the wool is selected from raw wool, raw wool after the raw wool wash, dyed or undyed wool slubbing, dyed or undyed wool yarn, roving, drawn-loop knits, formed-loop knits, wovens and cloths.

4. The non-felting wool of claim 2, wherein a water content of the wool is from about 4 to about 40 weight %.

5. The non-felting wool of claim 2, wherein the plasma pretreatment of the wool is selected from low temperature plasma treatment at reduced pressure and a corona treatment at normal pressure.

6. The non-felting wool of claim 2, wherein the plasma pretreatment comprises exposing the wool to plasma generated by electromagnetic radiation at a frequency of about 1 kHz to about 3 GHz and power density of about 0.003 to about 3 W/cm$^3$ at pressure of about 0.01 to about 10 mbar for about 1 to about 600 sec.

7. The non-felting wool of claim 6, wherein the electromagnetic radiation is supplied either continuously or pulsed.

8. The non-felting wool of claim 2, wherein the plasma pretreatment exposure takes place for about 2 to about 5 minutes.

9. The non-felting wool of claim 2, wherein the plasma pretreatment is carried out at about 0.01 to about 10 mbar.

10. The non-felting wool of claim 2, wherein the plasma pretreatment is carried out using an electrodeless plasma reactor comprising a reactor and an outcoupling unit for microwaves.

11. The non-felting wool of claim 10, wherein the wool is placed underneath the outcoupling unit at a distance of about 1 to about 30 cm.

12. The non-felting wool of claim 10, wherein the plasma reactor further comprises vacuum pumps that evacuate the reactor and vacuum locks that allow material to enter and exit the reactor without leakage of air.

13. The non-felting wool of claim 2, wherein the plasma pretreatment comprises treatment with plasma by corona treatment.

14. The non-felting wool of claim 13, wherein the corona treatment comprises exposing the wool to high frequency discharge having a power density of about 0.01 to about 5 Ws/cm$^2$ for about 1 to about 60 seconds.

15. The non-felting wool of claim 13, wherein the plasma is generated by applying alternating voltage of about 1 to about 20 kV at a frequency of about 1 kHz to about 3 GHz to an electrode comprising two poles wherein one or both poles are insulated with an insulator material.

16. The non-felting wool of claim 15, wherein alternating voltage is supplied in a manner selected from continuous, pulsed, pulsed with individual pulses, pulsed with pulse trains, and pulsed with pauses between pulses.

17. The non-felting wool of claim 15, wherein the distance form the electrode to the wool during plasma pretreatment is from 0 to about 15 mm.

18. The non-felting wool of claim 2, wherein the aqueous dispersion of cationic polyurethanes has an average molecular weight of at least about 14,000 to about 200,000.

19. The non-felting wool of claim 2, wherein the aqueous dispersion of cationic polyurethanes is applied to wool at pH of about 2 to 7.

20. The non-felting wool of claim 2, wherein the concentration of the aqueous dispersion of cationic polyurethanes based on a solids content of the polyurelhanes is about 0.6 to about 75 g/l.

* * * * *